(12) United States Patent
Kasai

(10) Patent No.: US 6,429,954 B1
(45) Date of Patent: Aug. 6, 2002

(54) IMAGE DISPLAY DEVICE

(75) Inventor: Ichiro Kasai, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/588,969

(22) Filed: Jun. 7, 2000

(30) Foreign Application Priority Data

Jun. 11, 1999 (JP) .......................................... 11-164773

(51) Int. Cl.$^7$ ................................................ G03H 1/00
(52) U.S. Cl. ............................. 359/13; 359/14; 359/15; 359/630
(58) Field of Search ............................. 359/13, 14, 15, 359/630, 631, 633

(56) References Cited

U.S. PATENT DOCUMENTS

| | | | | |
|---|---|---|---|---|
| 4,874,214 A | * | 10/1989 | Cheysson et al. ............. | 359/15 |
| 5,701,202 A | * | 12/1997 | Takahashi .................... | 359/631 |
| 5,768,025 A | * | 6/1998 | Togino et al. ............... | 359/630 |
| 6,204,975 B1 | * | 3/2001 | Watters et al. .............. | 359/633 |

FOREIGN PATENT DOCUMENTS

| | | |
|---|---|---|
| JP | 01-147421 A | 6/1989 |
| JP | 05-346508 A | 12/1993 |
| JP | 10-319343 A | 12/1998 |

OTHER PUBLICATIONS

Magarinos et al, "Holographic Mirrors", Optical Engineering, vol. 24, No. 5, pp. 769–780, Sep./Oct. 1985.*

* cited by examiner

*Primary Examiner*—Cassandra Spyrou
*Assistant Examiner*—Fayez Assaf
(74) *Attorney, Agent, or Firm*—Sidley Austin Brown & Wood LLP

(57) ABSTRACT

An image display device for displaying a combined image by combining an virtual image with an external object, has a reflective type hologram combiner having an optical power for forming a surface optically equivalent to the external object at a position different from the external object, an image display for displaying an image to be provided as the virtual image at the position of the surface formed by the optical power of the combiner, and a selection surface for selectively reflecting and transmitting an image light from the image display and an external light from the external object. In the image display device, the image light is reflected by the selection surface, reflected by the hologram combiner, transmitted through the selection surface, and thereafter directed to the pupil of an observer, while an external light is transmitted through the hologram combiner, transmitted through the selection surface, and thereafter directed to the pupil of the observer.

15 Claims, 8 Drawing Sheets

IMAGE DISPLAY DEVICE

CROSS REFERENCE TO RELATED APPLICATIONS

This application is based on patent application No. 11-164773 filed in Japan, the content of which is hereby incorporated by reference.

BACKGROUND OF THE INVENTION

1. Field of the Invention

The present invention relates to an image display device for use in front of the eyes of an observer, and specifically relates to the image display device that spatially combines a virtual image of an image displayed by a display device with an external object such as a natural background or the like of a front field of view via a hologram combiner for presentation to the observer.

2. Description of the Related Art

Image display devices used in front of the eyes of an observer are either head-mounted or handheld devices, and have been developed and commercialized as products ranging from an aircraft instrument to display flight information such as altitude and airspeed, to a personal theater devices to display movies, video games, and artificial realities. There is current research on using such devices as computer displays.

Such image display devices may be of a see-through type which allows the outside world to be seen, or a closed type which does not allow the outside world to be seen. A closed type device is desirable when displaying an artificial reality, and a see-through type device is generally desirable when used as a portable device. See-through image display devices are provided with a beam combiner for combing the virtual image light with external light in addition to an image display and a viewing optical system for providing a virtual image at a location readily viewable by a observer of an image displayed by the image display.

A half-mirror, polarizing beam splitter, hologram and the like can be used as a beam combiner. Since a reflective type hologram has a high degree of wavelength selectability, it can be used to diffract only light of specific wavelength, and image light of the specific wavelength can be overlaid on external light excluding this wavelength, such that there is very little loss of external light and viewing is excellent.

Image display devices of the see-through type using a reflective-type hologram of the aforesaid characteristics as a combiner are disclosed in Japanese Laid-Open Patent Nos. 5-346508 and 10-319343.

In an image display device using a reflective-type hologram combiner, since the image light participates from the viewing side relative to the hologram combiner, the image light entering the hologram combiner and the viewing light comprising external light and the reflected light of the image light exiting the hologram combiner must be separated.

For this reason, in the image display devices of the aforesaid disclosures, there is a large amount of decentering of the hologram combiner to make possible the separation of the image light and the viewing light. However, decentering distortion is generated due to the large amount of decentering of the hologram combiner, such that an excellent virtual image cannot be provided, and wide field angle projection light cannot be provided. Furthermore, compactness of the overall device is lost because the optical axis of the optical system from the image display to the hologram combiner is a straight line.

SUMMARY OF THE INVENTION

An object of the present invention is to provide an improved see-through type image display device.

Another object of the present invention is to provide a see-through image display device capable of providing excellent wide angle images in a compact structure suited for usage modes.

These objects are attained by a image display device having the following construction: an image display device for displaying a combined image by combining an virtual image with an external object, has a reflective type hologram combiner having an optical power for forming a surface optically equivalent to the external object at a position different from the external object; an image display for displaying an image to be provided as the virtual image at the position of the surface formed by the optical power of the combiner, and a selection surface for selectively reflecting and transmitting an image light from the image display and an external light from the external object, wherein the image light is reflected by the selection surface, reflected by the hologram combiner, transmitted through the selection surface, and thereafter directed to the pupil of an observer, while an external light is transmitted through the hologram combiner, transmitted through the selection surface, and thereafter directed to the pupil of the observer.

This image display device provides both bright displayed image and external object because it has a high degree of wavelength selectability and presents to the observer an overlay of the display image and external object via a reflective type hologram combiner which has minimal effect on the transmitted light. Furthermore, the hologram combiner has optical power such that the display image is viewed at the same position as the external object. That is, an observer views the display image as a virtual image focused at infinity. In this way, the hologram combiner has an eyepiece function to enlarge the display image and direct the image to the pupil of an observer. Since provision of a separate lens and the like having an eyepiece function is unnecessary, the overall device is simplified and compact.

The selection surface is provided to bend the optical path of the image light. A bright image is provided since, in the selection surface, the image light is completely reflected and directed to the hologram, and the viewing light comprising and overlay of the displayed light and external light is completely transmitted and directed to the pupil of an observer. Since the selection surface selects luminous flux via its entrance angle, the hologram combiner is greatly decentered, and optical path separation is unnecessary. Furthermore, an excellent quality image is provided at wide field angles.

In this image display device, the number of times the image light can be reflected by the selection surface before the image light entered the hologram combiner is not limited to a single reflection, and may be reflected a plurality of times. The overall device may be rendered more compact when constructed to utilize a plurality of such reflections.

BRIEF DESCRIPTION OF THE DRAWINGS

This and other objects and features of this invention will become clear from the following description taken in conjunction with the preferred embodiments with reference to the accompanying drawings, in which.

DETAILED DESCRIPTION OF THE PREFERRED EMBODIMENTS

The embodiments of the image display device of the present invention are described hereinafter with reference to the accompanying drawings.

First Embodiment

Figure 1:
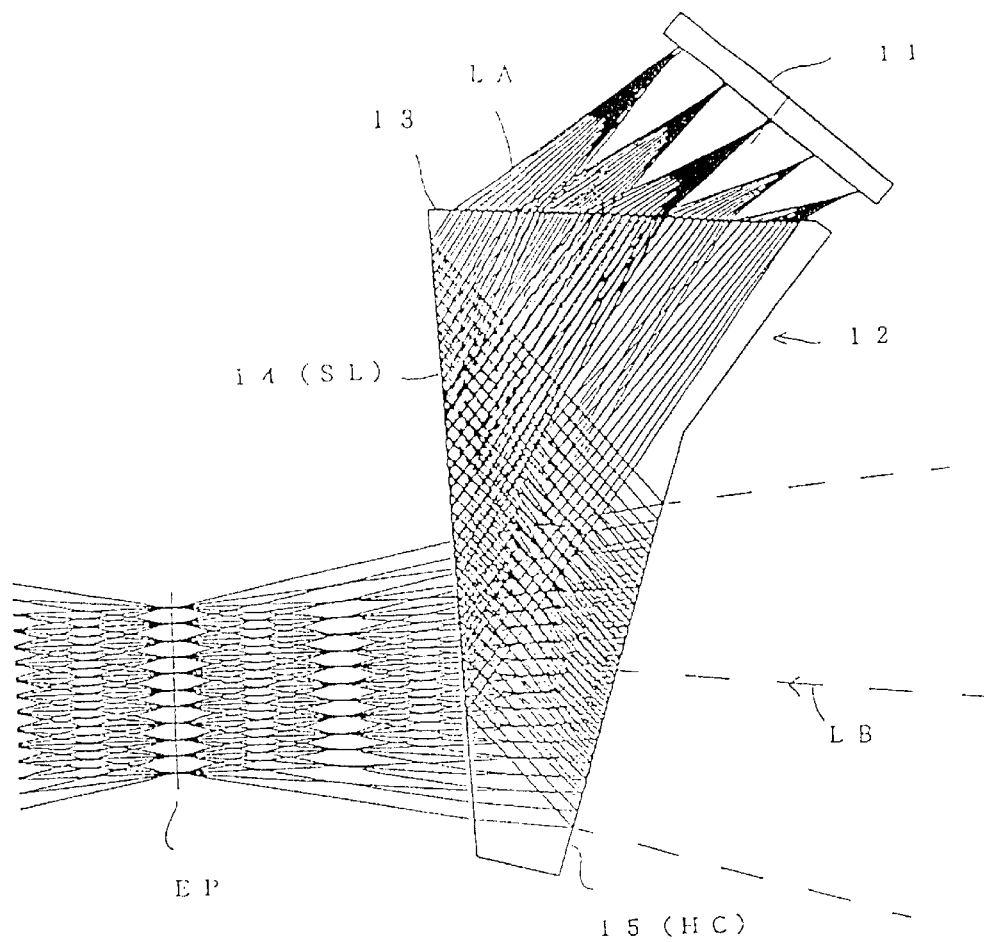
FIG. 1 is the structure of the optical system of the image display device of a first embodiment.

FIG. 1 shows the structure of the optical system of the image display device 1 of a first embodiment. The image display device 1 is provided with a image forming unit 11, and prism 12.

The image forming unit 11 displays in accordance with received image signals, and forms and emits image light LA based on the display image. The prism 12 is formed of polymethylmethacrylate (PMMA), and has surfaces 13, 14, and 15 as surfaces participating in the advancement of light. Surface 13 is an anamorphic aspherical concave surface, provided to transmit the entirety of the image light LA from the image forming unit 11. Surface 14 is planar, and provided to allow entrance of the image light LA transmitted through the surface 13 exceeding a critical angle, and the image light LA transmitted through surface 13 is completely reflected by the surface 14.

Surface 15 is planar, and forms a hologram of the volume-phase-reflective types. The wavelength of the image light LA formed by the image forming unit 11 approximately matches the wavelength of the diffraction efficiency peak of this hologram 15. In this way, the hologram 15 reflects the image light LA from the surface 14. The hologram 15 is transparent so as to transmit the external light LB. In this way, the hologram 15 functions as a hologram combiner HC to overlay the image light LA and the external light LB. The hologram combiner HC is provided so as to allow re-entrance of the image light LA completely reflected by the surface 14 into the surface 14 at an entrance angle smaller than the critical angle. Accordingly, the image light LA reflected by the hologram combiner HC and the external light LB transmitted by the hologram combiner HC both are transmitted by the surface 14 and enter the pupil EP of the observer.

The hologram combiner HC has optical power only relative to the image light LA entering from the surface 14, and has an eyepiece function of forming a virtual image of a display image at infinity viewed from the pupil EP of the observer. On the other hand, the hologram combiner HC does not have optical power and acts as a simple planar surface relative to the external light LB. In this way, the display image is enlarged and matches the magnification of the external image when viewed.

The surface 14 forms a selection surface SL for selectively transmitting and reflecting light in accordance its entrance angle. The image display device 1 has a compact structural arrangement with the optical path bent by the selection surface SL. Since the optical path is separated by the selection surface SL, the structure provides slight decentering of the hologram combiner HC, and reduces the generation of decentering aberration. In this way, an excellent display image is provided at wide angle of field.

The hologram combiner HC is not arranged to regularly reflect the image light LA, but a non-axially symmetrical optical system having optical power as an eyepiece function and is inclined relative to the image light LA. In non-axially symmetrical optical systems, when the hologram combiner HC only works similar to a co-axial lens, asymmetric distortion (trapezoidal distortion) and asymmetric image plane curvature are generated in the incline direction. It is therefore desirable that the hologram combiner HC possess not only simple rotationally symmetrical wave front reproducibility, but also a free curved surface wave front reconstruction.

Figure 2:
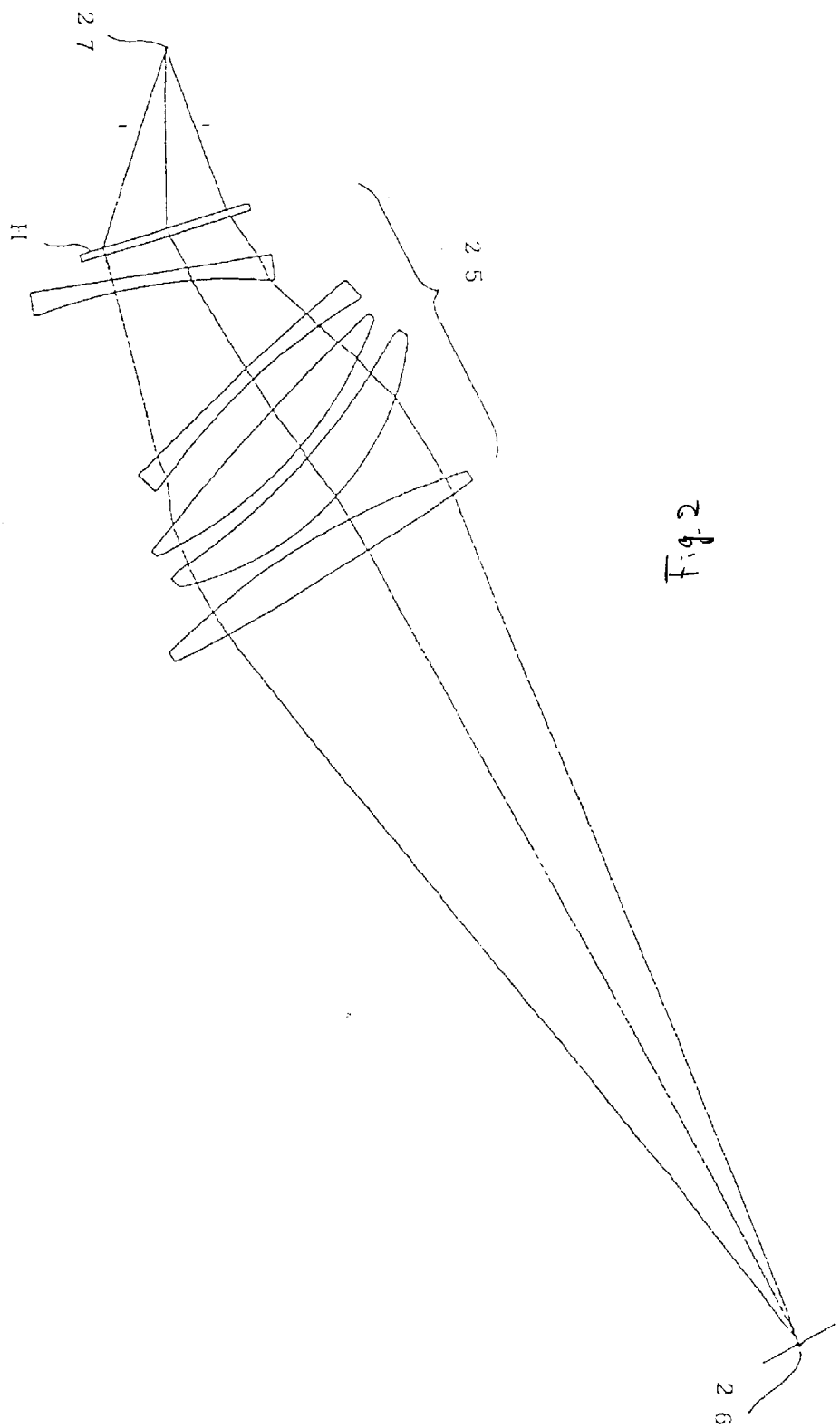
FIG. 2 briefly is the structure of an optical system for producing a hologram.

The method of forming a hologram in this hologram combiner HC is described below. FIG. 2 briefly shows the structure of an optical system for producing the hologram. In FIG. 2, H represents a substrate painted with photosensitive material for recording a hologram. Coherent rays emitted from a laser light source are split into two beams by a beam splitter not shown in the drawing. The polarization direction of the two rays is managed by a wavelength plate or the like not shown in the drawing. The two rays pass through pinholes at a focal point of a spherical wave-generating lens so as to be subjected to special filtering and be converted to spherical surface waves managed by the spherical surface. In FIG. 2, a first point light source 26 and a second point light source 27 match the pinholes used for special filtering.

The second point light source 27 is provided to approximately match the position of the pupil EP of the observer using the image display device 1 using the prepared hologram as a hologram combiner HC. Since the manufactured light of the manufactured state and the observation light of the use state nearly match when the position of the second point light source 27 matches the position of the pupil EP, the diffraction efficiency is vastly improved when the hologram combiner HC is used.

An optical system 25 assembled with a plurality of decentered lenses is arranged between the substrate H and the first point light source 26. The optical system 25 is decentered only in the cross section shown in FIG. 2. This optical system 25 is disposed so as to control the wave front during manufacture entering the substrate H such that the a virtual image of the display image is seen as an excellent image when the hologram combiner HC is used. It is desirable that the design and manufacture are extremely simple when the decentering of the optical system 25 is produced only within a single plane. Interference of the spherical waves entering from the first point light source 26 and the second point light source 27 are recorded on the substrate H to form the hologram.

The hologram basically vastly increases the diffraction efficiency of wave front regeneration via the participation of luminous flux identical to the luminous flux (wavelength and angle) that generated the hologram. In this way, the image light LA from the image forming unit 11 is desirably light of a wavelength that matches the wavelength of the diffraction efficiency peak of the hologram. For example, when a non-spontaneous type element is used, e.g., a liquid crystal, as the image forming unit 11 using a hologram combiner HC having a diffraction efficiency peak in the vicinity of 530 nm, a green color light emitting diode (LED) or the like having an emission peak near 530 nm is suitable as a light source for illuminating the liquid crystal.

A hologram of high wavelength selectivity must be used for the hologram combiner HC. When wavelength selectivity is low, the wavelength range of the external light LB reflected by the hologram combiner HC increases, and an unnaturally dark external image is seen. This unnaturalness is due to using a reflective type hologram as the hologram combiner HC. A reflective type hologram greatly increases the wavelength selectivity compared to a transmission type hologram. That is, the hologram responds to specific wavelengths and does not respond to other wavelengths. Since the hologram does not respond to wavelengths outside the wavelengths of part of the external light LB (i.e., the same wavelength as the image light LA), the external light LB is largely unaffected by the hologram 15. Accordingly, the external image and the display image can both be seen clearly and brightly. This is a major advantage which cannot be achieved by a transmission type hologram.

Figure 3:
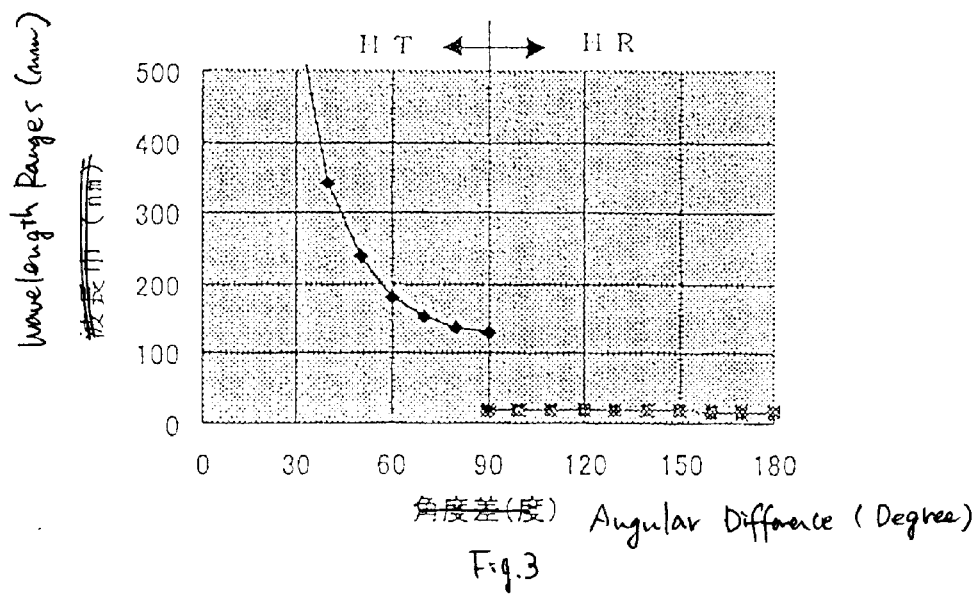
FIG. 3 illustrates the relationship between the angular difference of entering light and exiting light, and the hologram wavelength selectivity.

FIG. 3 shows the wavelength selectivities (wavelength ranges) of transmission type hologram HT and reflective type hologram HR relative to the angular difference θ of the entrance light and exit light when the photosensitive material refractivity is 1.5, forming wavelength is 530 nm, and photosensitive material thickness is 5 μm. It can be understood that when the angular difference θ is greater than 90°, the wavelength selectivity of the reflective hologram HR is very much greater than that of the transmission hologram HT.

Figure 4:
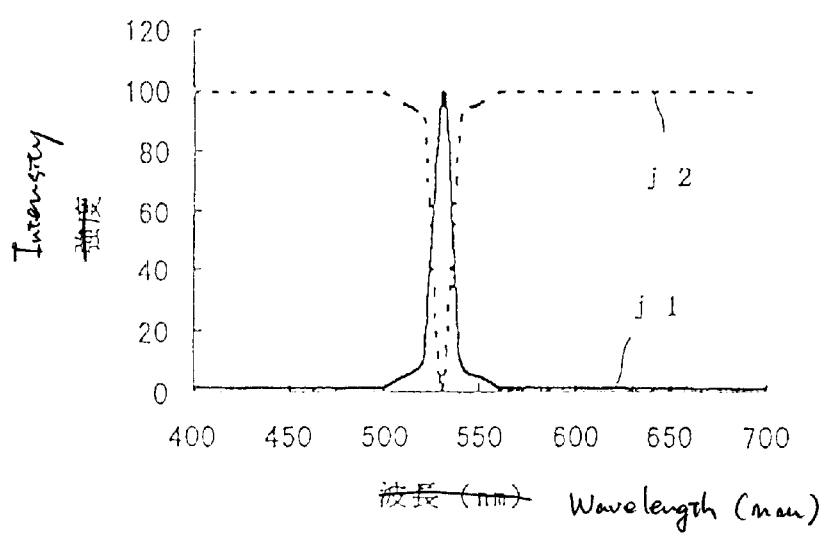
FIG. 4 is the intensity distribution of the reflected light and transmitted light in the visible range.

FIG. 4 shows the relationship of the intensities of the reflection light and transmission light relative to the wavelength of the entering light of the visible light range in the reflective type hologram HR shown in FIG. 3. The intensity distribution of the reflected light is represented as j1, and the intensity distribution of the transmitted light is represented as j2. It can be understood from FIG. 4 that only the wavelength (530 nm) of part of the transmission light, i.e., external light LB, is used in the image display device 1 since the reflective type hologram HR has such a very high degree of wavelength selectability.

In a thin hologram light is regenerated equivalent to high order diffraction light, but in a thick hologram (a so-called volume type hologram) light of only a single degree is regenerated. Accordingly, it is desirable that a volume type hologram capable of producing high diffraction efficiency is used as the hologram combiner HC. Although light passing through the hologram is absorbed in amplitude type holograms, light is not absorbed in phase type holograms. Accordingly, it is desirable that a phase type hologram capable of producing a bright display image is used as the hologram combiner HC. In the case of a volume type hologram, since a reflective type can possess high angular dependency compared to a transmission type, using a volume-reflective type hologram is advantageous in that the arrangement of the hologram combiner HC has a high degree of flexibility. For these reasons a volume-phase-reflective type hologram is used as the hologram combiner HC in the present embodiment.

Since a hologram with extremely high wavelength selectivity is used as the hologram combiner HC in the present embodiment, it is desirable that a very energy efficient construction is used when an LED having a broad emission wavelength range of half-band width 2~40 nm is used as the light source in the image forming unit 11. Of course, a laser having the same emission wavelength as the laser used to form the hologram may be used as the light source.

Specific setting values of the optical system of the image display device 1 are shown in Tables 1 and 2. The direction in front of the pupil represents the X-axis (rightward direction in FIG. 1), the vertical direction in FIG. 1 represents the Y-axis, and the depth direction of FIG. 1 represents the Z-axis.

TABLE 1

| Surface | Medium | Radius of Curvature | | | | | |
|---|---|---|---|---|---|---|---|
| 1 (EP) | Air | Infinity | | | | | |
| 2 (14) | PMMA | Infinity | | | | | |
| 3 (15) | Reflective Hologram | Infinity | | | | | |
| | | Definition of two luminous fluxes | | | | | |
| | | HX1: | 0.00000 | HY1: | 0.00000 | HZ1: | $-0.19500 \times 10^2$ |
| | | HX2: | 0.00000 | HY2: | $0.34169 \times 10^3$ | HZ2: | $-0.13671 \times 10^4$ |
| | | Phase Coefficient | | | | | |
| | | C2: | $6.2982 \times 10^{-2}$ | C3: | $1.1257 \times 10^{-3}$ | C5: | $1.2615 \times 10^{-2}$ |
| | | C7: | $-1.1473 \times 10^{-4}$ | C9: | $1.5903 \times 10^{-4}$ | C10: | $1.3354 \times 10^{-5}$ |
| | | C12: | $-5.8090 \times 10^{-5}$ | C14: | $-3.4686 \times 10^{-5}$ | C16: | $4.2768 \times 10^{-6}$ |
| | | C18: | $4.5460 \times 10^{-6}$ | C20: | $5.4521 \times 10^{-7}$ | C21: | $-1.4646 \times 10^{-6}$ |
| | | C23: | $3.7125 \times 10^{-8}$ | C25: | $1.9045 \times 10^{-7}$ | C27: | $-9.5584 \times 10^{-9}$ |
| | | C29: | $-1.3194 \times 10^{-7}$ | C31: | $-1.6448 \times 10^{-7}$ | C33: | $-1.0999 \times 10^{-7}$ |
| | | C35: | $-6.3990 \times 10^{-8}$ | C36: | $2.9985 \times 10^{-7}$ | C38: | $9.0135 \times 10^{-9}$ |
| | | C40: | $1.3338 \times 10^{-8}$ | C42: | $-3.3639 \times 10^{-9}$ | C44: | $1.2398 \times 10^{-8}$ |
| | | C46: | $1.3356 \times 10^{-9}$ | C48: | $1.5593 \times 10^{-9}$ | C50: | $1.6632 \times 10^{-9}$ |
| | | C52: | $9.4468 \times 10^{-10}$ | C54: | $9.5191 \times 10^{-10}$ | C55: | $-2.2359 \times 10^{-10}$ |
| | | C57: | $-1.3653 \times 10^{-10}$ | C59: | $-9.1392 \times 10^{-11}$ | C61: | $-2.9916 \times 10^{-10}$ |
| | | C63: | $1.2578 \times 10^{-10}$ | C65: | $-2.0978 \times 10^{-10}$ | | |
| 4 (14) | Reflective | Infinity | | | | | |
| 5 (13) | Air | 34.47094 | | | | | |
| | | Anamorphic Aspherical Surface | | | | | |
| | | KY: | 0.00000 | KX: | 0.00000 | RDX: | 34.21328 |
| | | AR: | $-0.12261 \times 10^{-4}$ | BR: | $-0.12306 \times 10^{-7}$ | CR: | $0.59932 \times 10^{-10}$ |
| | | AP: | $-0.14100$ | BP: | $-0.37450$ | CP: | $-0.674812$ |
| 6 (11) | | Infinity | | | | | |

TABLE 2

| Surface | XSC | YSC | ZSC | ASC | BSC | CSC |
|---|---|---|---|---|---|---|
| 1 (EP) | 0.000 | 0.000 | 0.000 | 0.000 | 0.000 | 0.000 |
| 2 (14) | 0.000 | 0.000 | 10.500 | 2.297 | 0.000 | 0.000 |
| 3 (15) | 0.000 | 0.000 | 16.128 | −17.703 | 0.000 | 0.000 |
| 4 (14) | 0.000 | 0.000 | 10.500 | 2.297 | 0.000 | 0.000 |
| 5 (13) | 0.000 | 20.403 | −6.641 | 66.312 | 0.000 | 0.000 |
| 6 (11) | 0.000 | 19.873 | 22.480 | 49.576 | 0.000 | 0.000 |

In Table 1, the hologram surface is unambiguously defined by defining the two luminous fluxes used in its creation. The wavelength of the two luminous fluxes used to form the hologram in the present embodiment was 530 nm. The two luminous fluxes are defined by the light source position of each luminous flux, the convergent beam (VIA) of the exit beam from each light source, and divergent beam (REA). The coordinates of the first point light source (HV1) and the second point light source (HV2) are (HX1, HY1, HZ1) and (HX2, HY2, HZ2), respectively.

Since wave front regeneration is accomplished by a complex hologram in the present embodiment, the hologram can be defined not only by the definitions of the two luminous fluxes, but also by the cosine of the direction of the emission rays relative to the entrance rays via a phase function $\phi$. The phase function $\phi$ is a generated polynomial via the (X,Y) position of the hologram surface as represented in equation 1, and the coefficients are represented by monomials of rising order from the first through tenth degree. Table 1 shows the coefficient Cj of the phase function $\phi$.

$$\phi = C_1X + C_2Y + C_3X^2 + C_4XY + C_5Y^2 + \ldots C_{65}Y^{10} \qquad (1)$$

In equation (1), the number j in the coefficient Cj is represented by equation 2 using m and n as exponents of X and Y.

$$j = \frac{(m+n)^2 + m + 3n}{2} \qquad (2)$$

The cosine in the X-axis, Y-axis, and Z-axis directions of the emission rays is represented by equation 3.

$$l' = l + \frac{\partial \phi}{\partial X} \cdot \frac{\lambda}{\lambda_0} \qquad (3)$$

$$m' = m + \frac{\partial \phi}{\partial Y} \cdot \frac{\lambda}{\lambda_0}$$

$$n' = l + \sqrt{1 - l'^2 - m'^2}$$

In equation 3, the symbols l', m', n' represent the respective emission ray normal line vectors, l, m, n represent the respective entrance ray normal line vectors, $\lambda$ represents the regenerated luminous flux wavelength, and $\lambda 0$ represents the hologram generating luminous flux wavelength.

In Table 1, parameters relating to the anamorphic aspherical surface, when the intersection of each surface and its optical axis specified as the origin point and the optical axis is the Z-axis, stipulate the sag-Z of the Z-axis direction defined by equation 4.

$$Z = \frac{CUX \cdot X^2 + CUY \cdot Y^2}{1 + \sqrt{1 - (1+KX) \cdot CUX^2 \cdot X^2 - (1+KY) \cdot CUY^2 \cdot Y^2}} + \qquad (4)$$

$$AR \cdot \{(1-AP) \cdot X^2 + (1+AP) \cdot Y^2\}^2 +$$

$$BR \cdot \{(1-BP) \cdot X^2 + (1+BP) \cdot Y^2\}^3 +$$

$$CR \cdot \{(1-CP) \cdot X^2 + (1+CP) \cdot Y^2\}^4$$

CUX and CUY are reciprocals of the radii of curvature in the X-axis direction and the Y-axis direction.

Table 2 shows the relative positional relationship of each surface. These positional relationships are expressed by a global coordinate system having the center of the pupil surface as the origin point. XSC, YSC, ZSC represent the X, Y, and Z coordinates (units: mm) of the intersection points of each surface and the optical axis, and ASC, BSC, CSC represent the rotational angle (units: degrees) of each surface from the pupil surface relative to the X-axis, Y-axis, Z-axis.

In the present embodiment, the hologram may be formed as a plane. Since a planar hologram does not have optical power relative to transmitted external light, there is no distortion of the external image, and a natural external image can be provided. The hologram may possess optical power relative to diffraction light even if planar. On the other hand, it is difficult to form a hologram in a curve. Using a planar hologram is also advantageous from this perspective.

Second Embodiment

Figure 5:
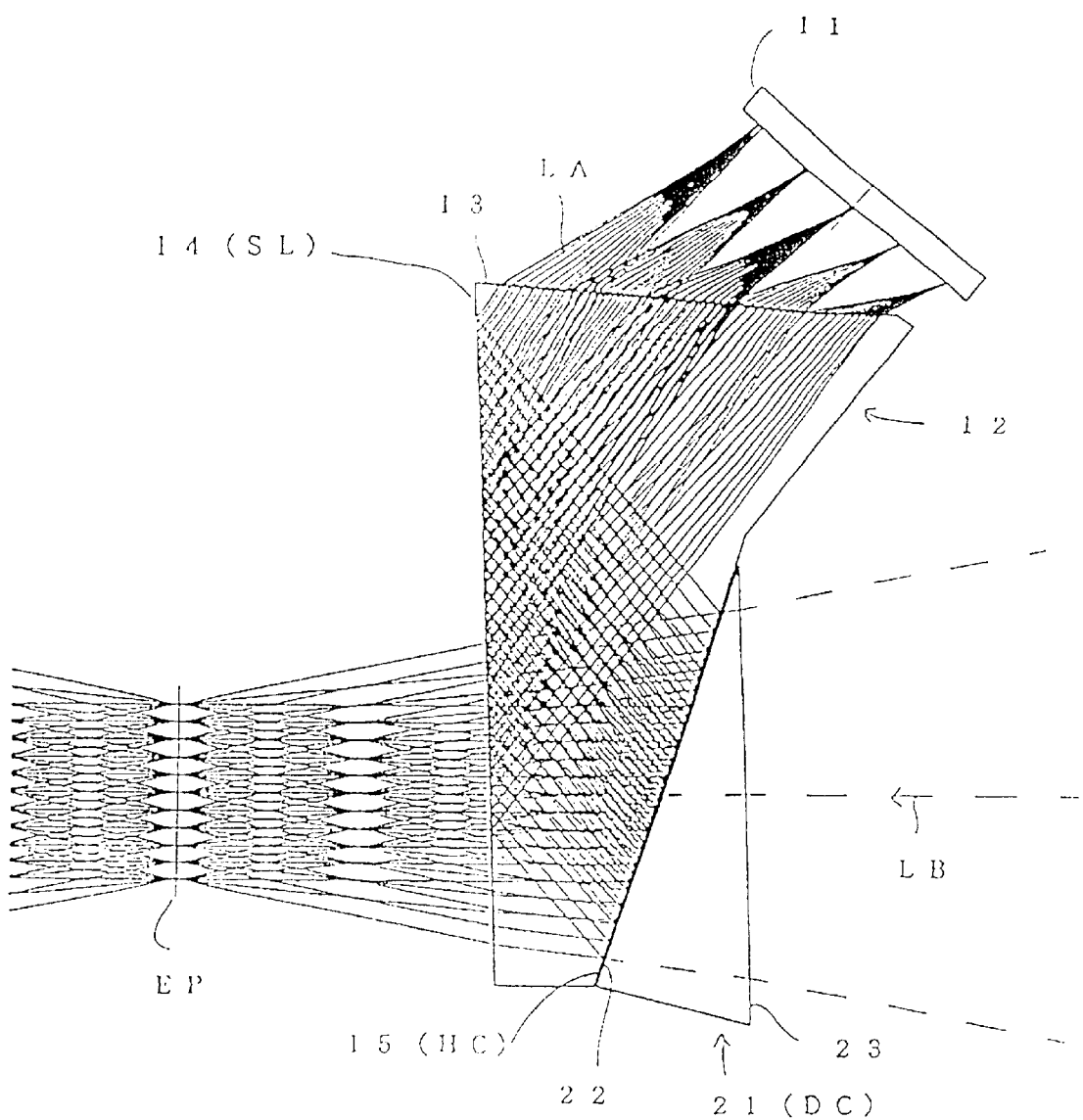
FIG. 5 is the structure of the optical system of the image display device of a second embodiment.

FIG. 5 shows the structure of the optical system of a image display device 2 of a second embodiment. The image display device 2 differs from the image display device 1 of the first embodiment only in that a prism 21 is provided. In other respects the structure is identical to that of the first embodiment.

In the image display device 1 of the first embodiment, the hologram combiner HC and the selection surface SL are not parallel, but are arranged at an inclination to reduce the amount of decentering of the hologram combiner HC. For this reason, the prism 12 is wedge shaped, and the external image is deflected at equal magnification. The prism 21 of the present embodiment is a deflection correction member DC which functions to correct the aforesaid deflection.

The prism 21 is a PMMA product, and is arranged such that a flat surface 22 confronts the surface 15 forming the hologram combiner HC of the prism 12. The surface 15 and the surface 22 are parallel. A small gap of several micrometers or less is formed between the surface 15 and the surface 22. The surface 23 (the outermost surface on the external image side) of the prism 21 and the surface 14 (the outermost surface on the pupil side) of the prism 12 are parallel.

The external light LB enters the pupil EP of an observer via the prisms 21 and 12, and deflection is corrected due to the air gap between the surfaces 22 and 15 as described above, and because the entrance surface 23 and exit surface 14 are parallel so as to make more natural external viewing possible.

Third Embodiment

Figure 6:
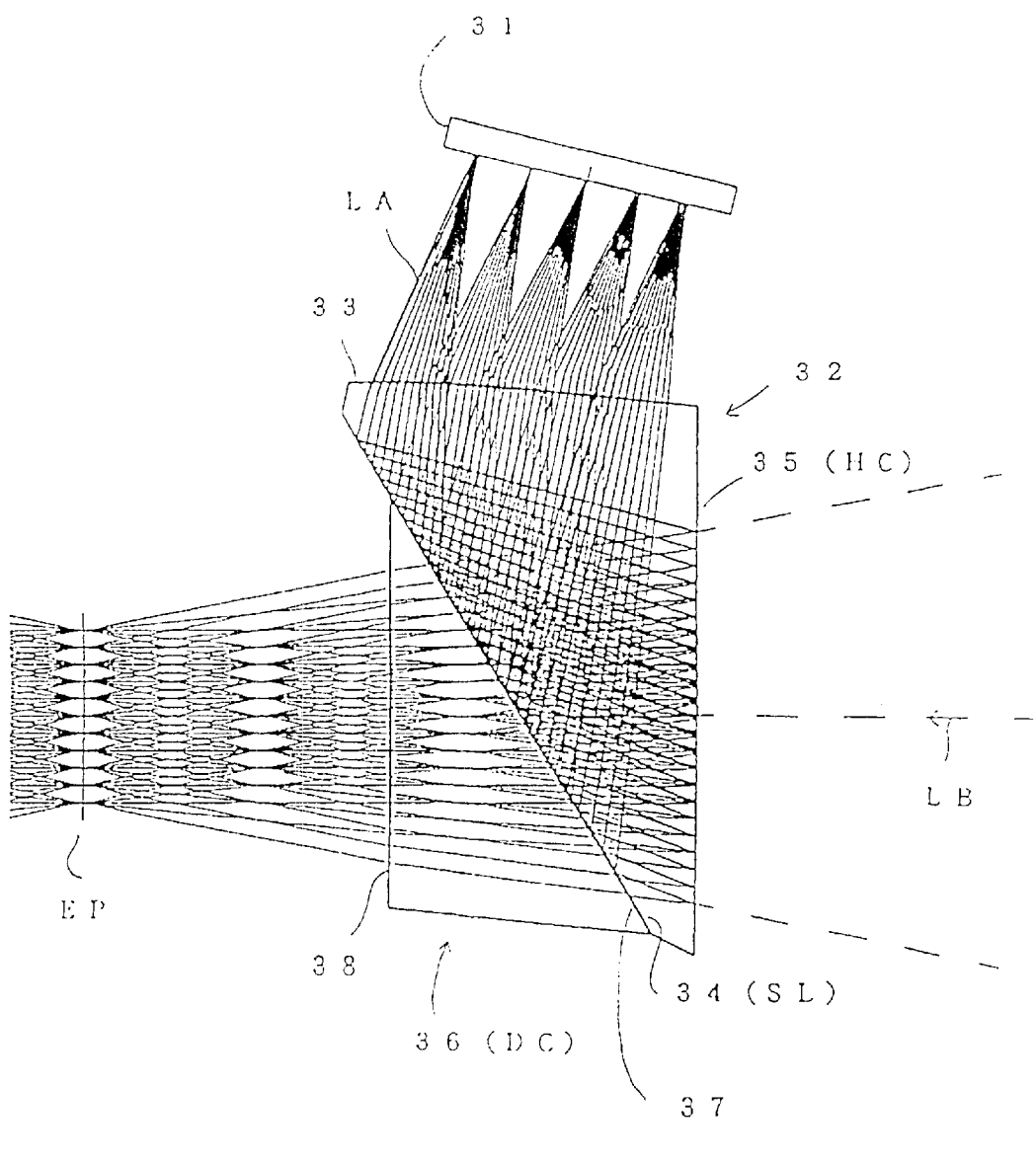
FIG. 6 is the structure of the optical system of the image display device of a third embodiment.

FIG. 6 shows the structure of the optical system of the image display device 3 of the third embodiment. The image display device 3 is provided with a image forming unit 31, and prisms 32 and 36.

The image forming unit 31 displays in accordance with received image signals, and emits the formed image light based on the display image. The prism 32 is a PMMA product, and has surfaces 33, 34, 35 as surfaces which participate in advancing the light. Surface 33 is an anamorphic aspherical concave surface, and is provided so as to transmit all image light LA from the image forming unit 31. Surface 34 is a planar surface, and is set so as to allow entry of image light LA passing through the surface 33 which exceeds a critical angle, and completely reflects the image light LA passing through the surface 33.

Surface 35 is a planar surface, and forms a hologram of a volume-phase-reflective type. The wavelength of the image light LA formed by the image forming unit 31 approximately matches the diffraction efficiency peak wavelength of the hologram 35. The hologram 35 reflects the image light LA from surface 34. The hologram 35 is transparent, and transmits the external light LB. In this way, the hologram 35 functions as a hologram combiner HC for overlaying the image light LA and the external light LB. The hologram combiner HC is set such that the image light LA completely reflected by the surface 34 re-enters the surface 34 at an entrance angle smaller than the critical angle. Accordingly, the projection light LA reflected by the surface 34 of the hologram combiner HC and the external light LB transmitted by the hologram combiner HC are transmitted through the surface 34 and enter the pupil EP of the observer via the prism 36.

The hologram combiner HC has optical power only relative to the image light LA entering from the surface 34, and has an eyepiece function for forming a virtual image of the display image at infinity viewed from the pupil EP of the observer. The hologram combiner HC has no optical power relative to the external light LB, and acts as a simple planar surface. In this way, the display image is enlarged and the external image is matched at equal magnification for viewing.

The surface 34 is the selection surface SL for selectively transmitting and reflecting in accordance with the entrance angle. Details of the hologram combiner HC and selection surface SL are similar to those of the first embodiment and are, therefore, omitted. Since there is less decentering of the hologram combiner HC in the present embodiment than in the first embodiment, the display image can be observed at wide angle with less decentering distortion.

The prism 32 is wedge shaped, and the external light LB passing through the prism 32 is deflected. The prism 36 is a deflection correction member DC and functions to correct this deflection.

The prism 36 is a PMMA product, and a planar surface 37 confronts the surface 34 forming the selection surface SL of the prism 32. The surfaces 34 and 37 are parallel. A small gap of several tens of micrometers or less is formed between the surfaces 34 and 37. The surface 35 (the outermost surface on the external image side) of the prism 32 and the surface 38 (the outermost surface on the pupil side) of the prism 36 are parallel.

The external light LB enters the pupil EP of an observer via the prisms 32 and 36, and deflection is corrected due to the air gap between the surfaces 34 and 37 as described above, and because the entrance surface 35 and exit surface 38 are parallel so as to make more natural external viewing possible.

Tables 3 and 4 show specific setting values of the optical system of the image display device 3.

TABLE 3

| Surface | Medium | Radius of Curvature | | | | | |
|---|---|---|---|---|---|---|---|
| 1 (EP) | Air | Infinity | | | | | |
| 2 (38) | PMMA | Infinity | | | | | |
| 3 (37) | Air | Infinity | | | | | |
| 4 (34) | Air | Infinity | | | | | |
| 5 (35) | Reflective Hologram | Infinity | | | | | |
| | | Definition of two luminous fluxes | | | | | |
| | | HV1: | REA | | HV1: | VIR | |
| | | HX1: | 0.00000 | | HY1: | 0.00000 | HZ1: $-0.19500 \times 10^2$ |
| | | HX2: | 0.00000 | | HY2: | $0.15463 \times 10^3$ | HZ2: $-0.21071 \times 10^3$ |
| | | Phase Coefficient | | | | | |
| | | C2: | $-9.6778 \times 10^{-2}$ | C3: | $1.0081 \times 10^{-3}$ | CS: | $4.6245 \times 10^{-3}$ |
| | | C7: | $-3.7544 \times 10^{-6}$ | C9: | $-1.2329 \times 10^{-4}$ | C10: | $7.9909 \times 10^{-6}$ |
| | | C12: | $-4.8046 \times 10^{-5}$ | C14: | $-4.0747 \times 10^{-5}$ | C16: | $8.5955 \times 10^{-7}$ |
| | | C18: | $1.7815 \times 10^{-6}$ | C20: | $4.3556 \times 10^{-6}$ | C21: | $-9.8540 \times 10^{-7}$ |
| | | C23: | $9.3441 \times 10^{-7}$ | C25: | $1.8415 \times 10^{-6}$ | C27: | $1.1315 \times 10^{-6}$ |
| | | C29: | $-5.9767 \times 10^{-8}$ | C31: | $-7.6595 \times 10^{-8}$ | C33: | $-5.0543 \times 10^{-8}$ |
| | | C35: | $-1.8459 \times 10^{-7}$ | C36: | $1.9503 \times 10^{-8}$ | C38: | $-1.6966 \times 10^{-8}$ |
| | | C40: | $-2.6558 \times 10^{-8}$ | C42: | $-4.6423 \times 10^{-8}$ | C44: | $-1.9152 \times 10^{-8}$ |
| | | C46: | $6.2478 \times 10^{-10}$ | C48: | $3.3198 \times 10^{-10}$ | C50: | $1.0792 \times 10^{-9}$ |
| | | C52: | $-1.7513 \times 10^{-11}$ | C54: | $2.2714 \times 10^{-9}$ | C55: | $-1.3517 \times 10^{-10}$ |
| | | C57: | $1.4446 \times 10^{-10}$ | C59: | $1.3682 \times 10^{-10}$ | C61: | $3.6170 \times 10^{-10}$ |
| | | C63: | $4.0980 \times 10^{-10}$ | C65: | $1.1649 \times 10^{-10}$ | | |
| 6 (34) | Reflective | Infinity | | | | | |
| 7 (33) | Air | 96.26910 | | | | | |
| | | Anamorphic Aspherical Surface | | | | | |
| | | KY: | 0.00000 | KX: | −9.42033 | RDX: | −116.90955 |
| | | AR: | $-2.0343 \times 10^{-4}$ | BR: | $-0.82633 \times 10^{-7}$ | CR: | $-0.43992 \times 10^{-9}$ |
| | | AP: | 0.24889 | BP: | 0.15483 | CP: | $0.63333 \times 10^{-1}$ |
| | | | Infinity | | | | |

TABLE 4

| Surface | XSC | YSC | ZSC | ASC | BSC | CSC |
|---|---|---|---|---|---|---|
| 1 (EP) | 0.000 | 0.000 | 0.000 | 0.000 | 0.000 | 0.000 |
| 2 (38) | 0.000 | 0.000 | 10.500 | 0.000 | 0.000 | 0.000 |
| 3 (37) | 0.000 | 4.375 | 12.345 | 30.530 | 0.000 | 0.000 |
| 4 (34) | 0.000 | 4.401 | 12.388 | 30.530 | 0.000 | 0.000 |
| 5 (35) | 0.000 | 20.826 | 0.000 | 0.000 | 0.000 | 0.000 |
| 6 (34) | 0.000 | 4.401 | 12.388 | 30.530 | 0.000 | 0.000 |
| 7 (33) | 0.000 | 11.139 | 8.927 | 95.541 | 0.000 | 0.000 |
| 8 (31) | 0.000 | 18.442 | 17.199 | 75.724 | 0.000 | 0.000 |

The parameters used in Tables 3 and 4 observe the same stipulations as in the first embodiment.

Fourth Embodiment

Figure 7:
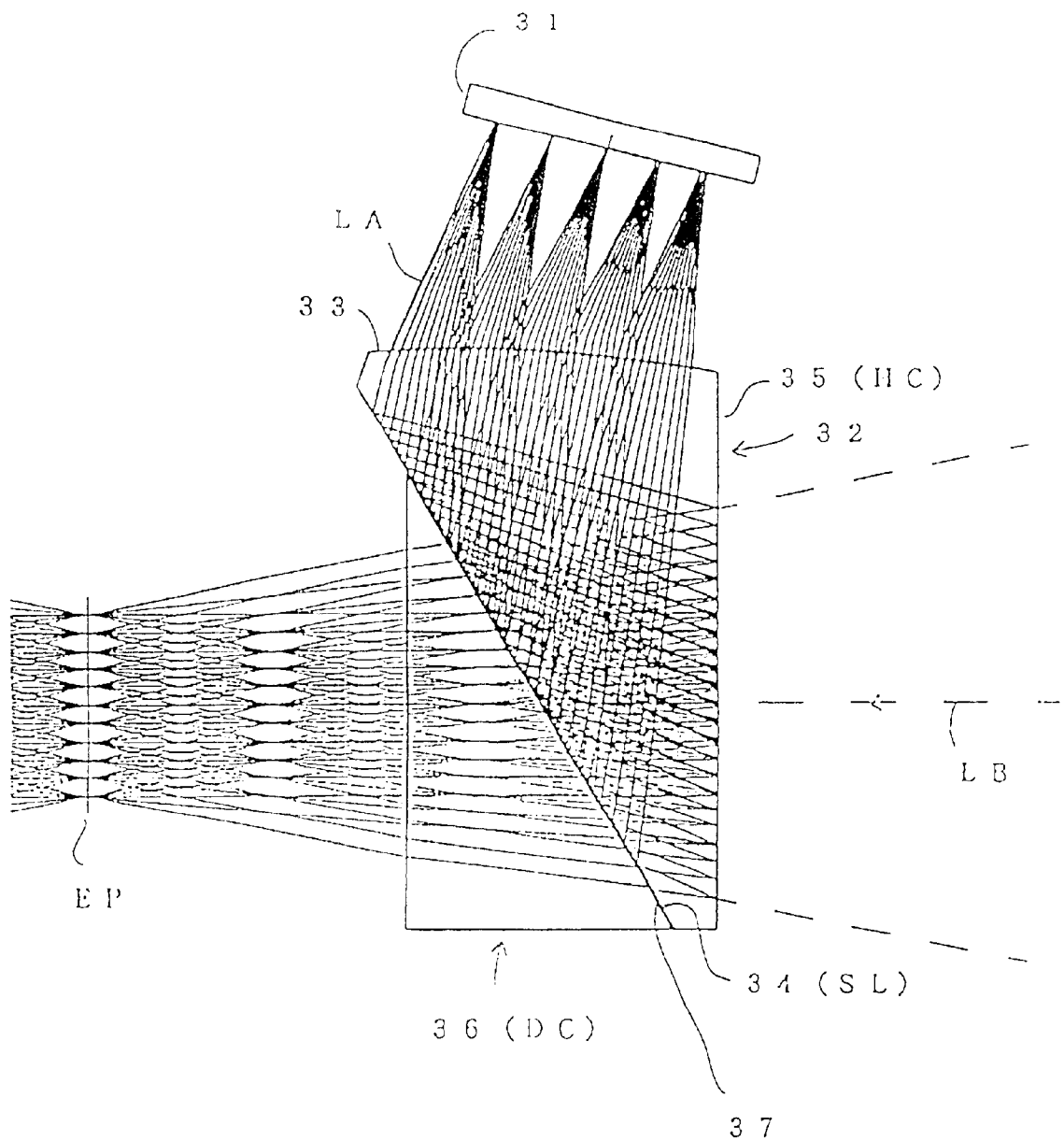
FIG. 7 is the structure of the optical system of the image display device of a fourth embodiment.

FIG. 7 shows the structure of the optical system of a image display device 4 of the fourth embodiment. The basic structure of the image display device 4 is identical to that of the third embodiment with the exception that the surface of the selection surface SL in the third embodiment is curved and has a aberration correction function relative to the display image.

Since the surface 34 forming the selection surface SL of the image display device 4 is an anamorphic curved surface, it is possible to design further improvement of the aberration performance of the observed display image. Furthermore, in order to negate the effect on the transmitted light caused by curving the selection surface SL, the surface 37 confronting the selection surface SL of the prism 36 acting as a deflection correction member DC is also an anamorphic curved surface identical to the surface 34.

Tables 5 and 6 show specific setting values of the optical system of the image display device 4.

TABLE 5

| Surface | Medium | Radius of Curvature | | | | | |
|---|---|---|---|---|---|---|---|
| 1 (EP) | Air | Infinity | | | | | |
| 2 (38) | PMMA | Infinity | | | | | |
| 3 (37) | Air | Infinity | | | | | |
| | | Anamorphic Aspherical Surface | | | | | |
| | | KY: | 0.00000 | KX: | 0.00000 | RDX: | −1662.10390 |
| | | AR: | $-0.20879 \times 10^{-6}$ | BR: | $0.81325 \times 10^{-10}$ | CR: | $-0.43963 \times 10^{-12}$ |
| | | AP: | 0.61041 | BP: | $0.20079 \times 10$ | CP: | $0.13968 \times 10$ |
| 4 (34) | Air | Infinity | | | | | |
| | | Anamorphic Aspherical Surface | | | | | |
| | | KY: | 0.00000 | KX: | 0.00000 | RDX: | −1662.10390 |
| | | AR: | $-0.20879 \times 10^{-6}$ | BR: | $0.81325 \times 10^{-10}$ | CR: | $-0.43963 \times 10^{-12}$ |
| | | AP: | 0.61041 | BP: | $0.20079 \times 10$ | CP: | $0.13968 \times 10$ |
| 5 (35) | Reflective Hologram | Infinity | | | | | |
| | | Definition of two luminous fluxes | | | | | |
| | | HV1: | REA | HV1: | VIR | | |
| | | HX1: | 0.00000 | HY1: | 0.00000 | HZ1: | $-0.19500 \times 10^2$ |
| | | HX2: | 0.00000 | HY2: | $0.15265 \times 10^3$ | HZ2: | $-0.20904 \times 10^3$ |
| | | Phase Coefficient | | | | | |
| | | C2: | $-9.5595 \times 10^{-2}$ | C3: | $9.2480 \times 10^{-4}$ | C5: | $4.5134 \times 10^{-3}$ |
| | | C7: | $-4.2474 \times 10^{-6}$ | C9: | $-1.2782 \times 10^{-4}$ | C10: | $7.7600 \times 10^{-6}$ |
| | | C12: | $-4.9556 \times 10^{-5}$ | C14: | $-3.9826 \times 10^{-5}$ | C16: | $8.5291 \times 10^{-7}$ |
| | | C18: | $1.9236 \times 10^{-6}$ | C20: | $4.1596 \times 10^{-6}$ | C21: | $-9.8585 \times 10^{-7}$ |
| | | C23: | $9.2922 \times 10^{-7}$ | C25: | $1.8386 \times 10^{-6}$ | C27: | $1.1600 \times 10^{-6}$ |
| | | C29: | $-5.9762 \times 10^{-8}$ | C31: | $-7.5673 \times 10^{-8}$ | C33: | $-5.0819 \times 10^{-8}$ |
| | | C35: | $-1.8791 \times 10^{-7}$ | C36: | $1.9512 \times 10^{-8}$ | C38: | $-1.6967 \times 10^{-8}$ |
| | | C40: | $-2.6528 \times 10^{-8}$ | C42: | $-4.6177 \times 10^{-8}$ | C44: | $-1.8687 \times 10^{-8}$ |
| | | C46: | $6.3195 \times 10^{-10}$ | C48: | $3.4778 \times 10^{-10}$ | C50: | $1.0983 \times 10^{-9}$ |
| | | C52 | $8.4102 \times 10^{-12}$ | C54: | $2.2140 \times 10^{-9}$ | C55: | $-1.3513 \times 10^{-10}$ |
| | | C57: | $1.4459 \times 10^{-10}$ | C59: | $1.3554 \times 10^{-10}$ | C61: | $3.5321 \times 10^{-10}$ |
| | | C63: | $4.0137 \times 10^{-10}$ | C65: | $1.2121 \times 10^{-10}$ | | |
| 6 (34) | Reflective | −4721.65930 | | | | | |
| | | Anamorphic Aspherical Surface | | | | | |
| | | KY: | 0.00000 | KX: | 0.00000 | RDX: | −1662.10390 |
| | | AR: | $-0.20879 \times 10^{-6}$ | BR: | $0.81325 \times 10^{-10}$ | CR: | $-0.43963 \times 10^{-12}$ |
| | | AP: | 0.61041 | BP: | $0.20079 \times 10$ | CP: | $0.13968 \times 10$ |
| 7 (33) | Air | 106.62910 | | | | | |
| | | Anamorphic Aspherical Surface | | | | | |
| | | KY: | 0.00000 | KX: | −6.43699 | RDX: | −110.45453 |
| | | AR: | $-2.0353 \times 10^{-6}$ | BR: | $-0.79708 \times 10^{-10}$ | CR: | $-0.42379 \times 10^{-12}$ |
| | | AP: | 0.23632 | BP: | 0.11374 | CP: | 0.30989 |
| 8 (31) | | Infinity | | | | | |

TABLE 6

| Surface | XSC | YSC | ZSC | ASC | BSC | CSC |
|---|---|---|---|---|---|---|
| 1 (EP) | 0.000 | 0.000 | 0.000 | 0.000 | 0.000 | 0.000 |
| 2 (38) | 0.000 | 0.000 | 10.500 | 0.000 | 0.000 | 0.000 |
| 3 (37) | 0.000 | 4.377 | 12.343 | 30.585 | 0.000 | 0.000 |
| 4 (34) | 0.000 | 4.403 | 12.385 | 30.585 | 0.000 | 0.000 |
| 5 (35) | 0.000 | 0.000 | 20.903 | 0.000 | 0.000 | 0.000 |
| 6 (34) | 0.000 | 4.403 | 12.385 | 30.585 | 0.000 | 0.000 |
| 7 (33) | 0.000 | 11.085 | 8.934 | 95.535 | 0.000 | 0.000 |
| 8 (31) | 0.000 | 18.494 | 17.161 | 75.710 | 0.000 | 0.000 |

The parameters used in Tables 5 and 6 observe the same stipulations as in the first embodiment.

Fifth Embodiment

Figure 8:
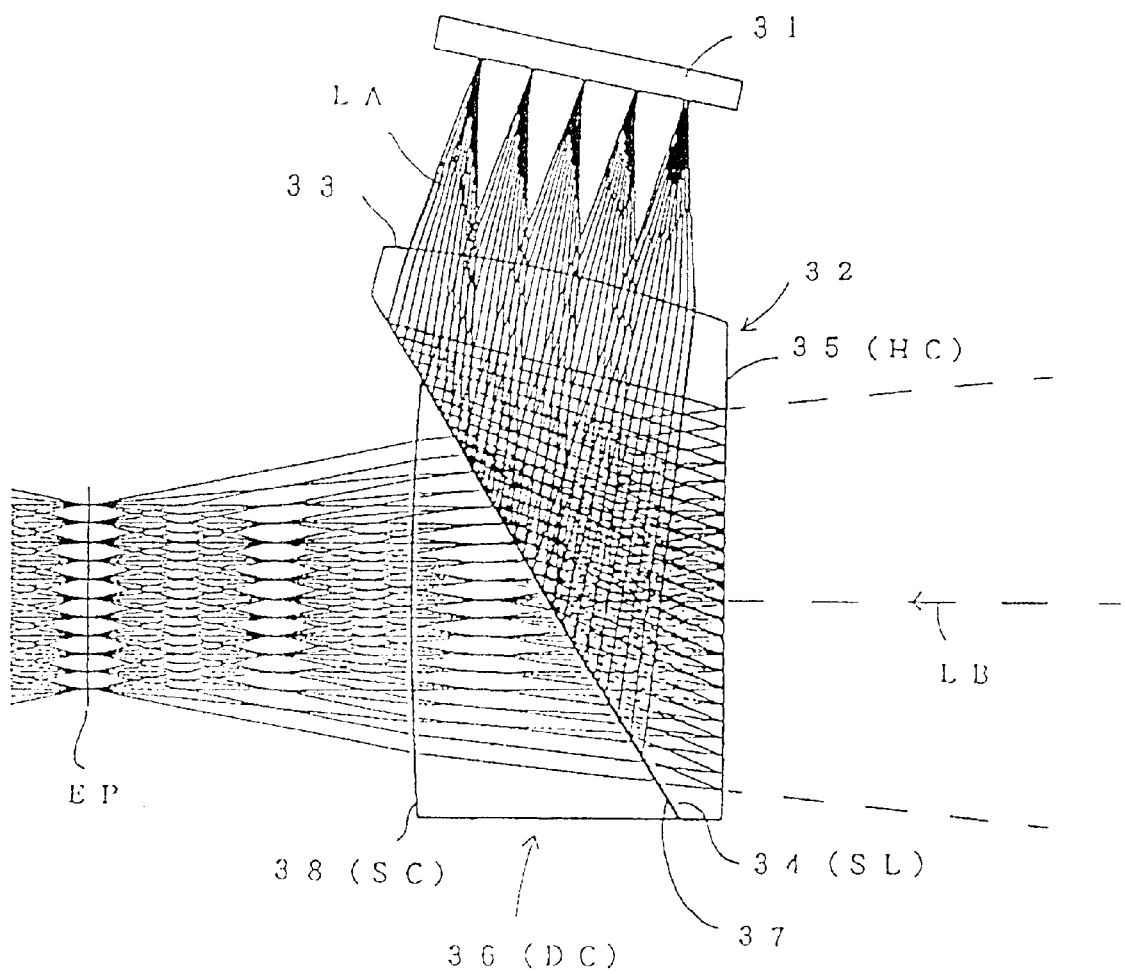
FIG. 8 is the structure of the optical system of the image display device of a fifth embodiment.

FIG. 8 shows the structure of the optical system of a image display device 5 of the fifth embodiment. The image display device 5 is identical to that of the third embodiment with the exception that the surface 38 on the outermost pupil side is curved and has optical power in the image display device 3 of the third embodiment.

The surface 38 has optical power for optimizing the diopter of the observer or the diopter of the external image being viewed. That is, the surface 38 is a surface SC having a diopter correction function, and can produce a viewing image optimized for diopter by an observer in the image display device 5, so as to provide more suitable image viewing.

Sixth Embodiment

Figure 9:
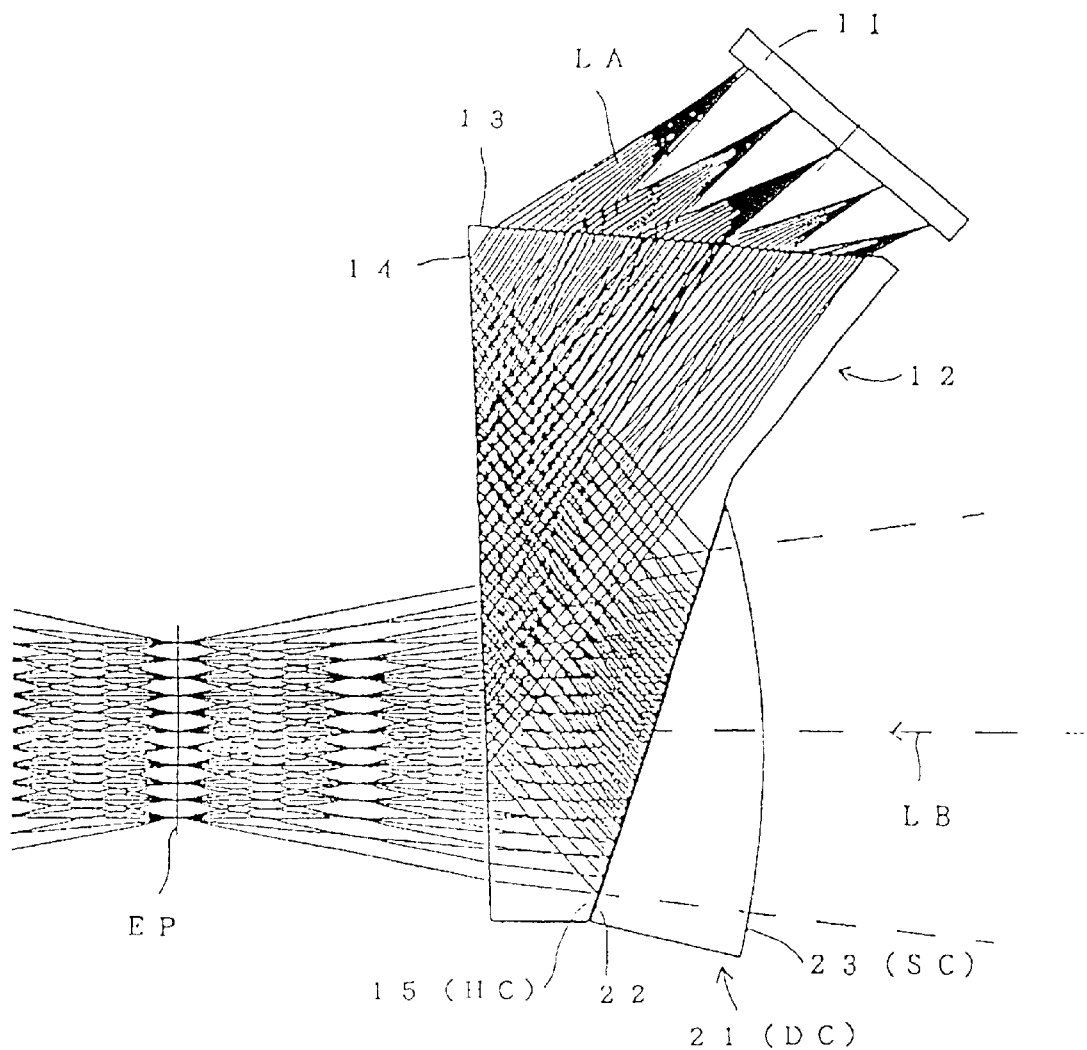
FIG. 9 is the structure of the optical system of the image display device of a sixth embodiment.

FIG. 9 shows the structure of the optical system of a image display device 6 of the sixth embodiment. The image display device 6 is identical to the image display device 2 with the exception that the surface 23 on the outermost external image side is curved and has optical power in the image display device 2 of the second embodiment.

The surface 23 has optical power for optimizing the diopter of the observer or the diopter of the external image being viewed. That is, the surface 23 is a surface SC having a diopter correction function, and can produce a viewing image optimized for diopter by an observer in the image display device 6, so as to provide more suitable image viewing.

The structure of each embodiment provides to an observer an excellent display image having scan decentering aberration at wide angle of field. A bright, natural external image is provided by using a reflective type hologram as a combiner. A structure which allows enlarged display of a display image while achieving compactness and simplicity without provided extra lenses and the like is accomplished by a structure providing both optical power and an eyepiece function in a hologram.

In a structure having a hologram of planar surface, the optical power of the hologram does not influence the external light such that natural external light can be viewed.

In a structure providing a deflection correction means having a diopter correction surface, a viewing image is provided which is optimized for the diopter of the observer.

In a structure providing a selection surface having optical power, an even more excellent image can be provided by using the selection surface as an aberration corrector.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image display device for displaying a combined image by combining a virtual image with an image of an external object, comprising:

an image display for displaying the virtual image, the virtual image comprising light in a selected frequency band; and a combining prism including a material having a refractive index greater than one, and having a holographic reflective surface and a selection surface, wherein the holographic reflective surface is reflective of light in the selected frequency band and the selection surface selectively reflects and transmits the virtual image from the image display, the image display being positioned to direct the image onto the selection surface at an angle of incidence greater than a critical angle, wherein the virtual image is reflected by the selection surface, is reflected by the holographic reflective surface, is transmitted through the selection surface, and is directed to the pupil of an observer, while the image of an external object is transmitted through the holographic reflective surface, transmitted through the selection surface, and directed to the pupil of the observer.

2. An image display device as claimed in claim 1, wherein the selection surface provides a reflected image to the holographic reflective surface that is decentered.

3. An image display device as claimed in claim 1, wherein the holographic reflective surface is a plane.

4. An image display device as claimed in claim 1, further comprising:

a deflection correcting member for correcting deflection caused by deflection of a transmitted part of the image of the external object from the virtual image.

5. An image display device as claimed in claim 4, wherein the deflection correcting member has a diopter correction surface having optical power to correct diopter.

6. An image display device as claimed in claim 1, wherein the combining prism comprises polymethylmethacrylate.

7. An image display device as claimed in claim 1, wherein the image display includes a plurality of light emitting diodes.

8. An image display device as claimed in claim 1, wherein the holographic reflective surface is a volume-phase-reflective type holographic surface.

9. An image display device as claimed in claim 1, wherein the holographic reflective surface is a volume-phase-reflective type holographic surface.

10. An image display device for displaying a combined image by combining a virtual image with an image of an external object, comprising:

an image display for displaying the virtual image, the image display including a plurality of light emitting diodes that are energized to create the image comprising light in a selected frequency band; and a combining prism including a material having a refractive index greater than one, and having a holographic reflective surface and a selection surface, wherein the holographic reflective surface is reflective of light in the selected frequency band and wherein the selection surface selectively reflects and transmits the virtual image from the image display, the image display being positioned to direct the virtual image onto the selection surface at an angle of incidence greater than the critical angle, wherein the virtual image is reflected by the selection surface, is reflected by the holographic reflective surface, is transmitted through the selection surface, and is directed to the pupil of an observer, while the image of the external object is transmitted through the holographic reflective surface, is transmitted through the selection surface, and is directed to the pupil of the observer.

11. An image display device as claimed in claim 10 wherein the selection surface provides a reflected image to the holographic reflective surface that is decentered.

12. An image display device as claimed in claim 10, wherein the holographic reflective surface is a plane.

13. An image display device as claimed in claim 10, further comprising:
a deflection correcting member for correcting deflection caused by the deflection of a transmitted part of the image of the external object from the virtual image.

14. An image display device as claimed in claim 12, wherein the deflection correcting member has a diopter correction surface having optical power to correct diopter.

15. An image display device as claimed in claim 10, wherein the combining prism comprises of polymethylmethacrylate.

* * * * *